United States Patent Office 3,218,176
Patented Nov. 16, 1965

3,218,176
GELATIN JELLY DESSERT
Emery Polya, Tarrytown, and Bruce A. Lister, Baldwin, N.Y., assignors to General Foods Corporation, White Plains, N.Y., a corporation of Delaware
No Drawing. Filed Nov. 6, 1962, Ser. No. 235,838
4 Claims. (Cl. 99—130)

This invention relates to fruit-flavored gelatin jelly desserts containing a combination of adipic and fumaric acid as the acidulent.

In recent years adipic and fumaric acids have been used exclusive of one another in gelatin jelly dessert mixes to improve the caking resistance of the mix while at the same time imparting the desired tartness to the final gelled product. While both fumaric and adipic acid provide the mix with a distinct improvement in caking resistance when compared to other food acids such as citric, malic, and tartaric, which are hygroscopic in nature and therefore give rise to agglomeration of the powderous ingredients of the mix, the use of fumaric acid alone has been found to have a marked improvement in resistance to caking over adipic acid when used alone. This difference is quite manifest in the storage conditions encountered commercially and therefore makes fumaric acid a highly preferred anti-caking ingredient of gelatin jelly dessert mixes.

Fumaric acid has a mild acid type taste, and in combination with flavors, does not interfere with the flavor and aroma overtones thereof; this stems from the bland flavor character of the fumaric acid, as well as its acid salts. Moreover, besides serving as a superior anti-caking ingredient, fumaric acid also serves to inhibit or diminish the tendency of the dessert ingredients to brown on storage. Adipic acid does not exhibit this latter property at all. Browning of the dessert ingredients on storage is primarily due to the Maillard reaction which occurs when a carbohydrate, such as sugar, and the protein in the gelatin are kept in contact for a long period of time, i.e., commercial storage conditions. In the case of fumaric acid, the browning tendency of the ingredients appears to be diminished due to the lower pH of the dessert ingredients during storage.

However, fumaric acid has a most serious disadvantage in that desired tartness is accomplished in a jelly solution having a pH in the neighborhood of pH 3.1 to pH 3.3. This low pH range results in a substantially higher gelatin usage than in gelatin jelly desserts which use a relatively high pH range of pH 3.9 to pH 4.2 as is possible with adipic acid. However, adipic acid has a flavor disadvantage in that it has a mineral-type taste which imparts a sharp flavor note to the gelatin gel which tends to block the impact or emergence of fruit flavorings. Consequently, a high proportion of the expensive flavoring materials is required in the packaging of gelatin dessert mixes employing substantial levels of adipic acid.

It would therefore be highly desirable to combine the separate advantages of each of these acids to achieve a superior and unique product which has the low gelatin use requirements of the adipic acid system while at the same time having the superior caking-resistance and anti-browing tendency of the fumaric acid system. The prior art has not combined these acids due to the belief that the beneficial effects of each acid would be lost by their combination. It would be expected that the advantages of each acid is only proportional to its level of use and therefore the use of combined equal parts by weight of fumaric and adipic acid to achieve the desired pH tartness attained with one acid would be lost to a large extent due to the lower level of use.

However, it has been found that when these particular acids are combined in certain critical proportions, a novel gelatin jelly dessert mix is produced which requires a low level of gelatin while at the same time having an unexpected caking resistance and anti-browning tendency which is equivalent to a gelatin dessert mix which uses fumaric acid alone as the acidulent. Moreover, it has been found that a combination of the acids within the critical proportions employed reduces the sharp mineral taste of adipic acid while promoting the emergence or impact of fruit flavors.

The present invention is directed to using 10–35% by weight fumaric acid as a minor acidulent along with 65–90% by weight of adipic acid as a major acidulent in a gelatin jelly dessert mix. The combined acids give a superior product from the standpoint of flavor, low-gelatin usage, caking-resistance, and anti-browning resistance which can only be achieved by using the acid combination of this invention.

It has been found that the caking resistance, as well as the prevention of browning, is unexpectedly improved by the replacement of small amounts of adipic acid with fumaric acid. This improvement is much more than would be expected from the small proportional amount of fumaric acid used. Advantageously, the fumaric acid at a minor proportion of less than 35% by weight, and as low as 10% by weight, of the acidulent employed provides a gelatin dessert composition which is substantially resistant to caking and browning to the same degree as when using 100% fumaric. Moreover, at the stated range the sharp mineral-like quality of the adipic acid is significantly minimized, thereby providing an acidulent of suitable tartness which permits the emergence or impact of fruit flavors added to the mix and present in the mix solution upon gellification thereof.

The flavor improvement, as well as the other effects, are achieved at a relatively high pH range of pH 3.7 to 4.0 and this pH range allows a significant saving in the amount of gelatin. The sum total of all these effects can only be accomplished by using a combination of adipic and fumaric in the above stated proportions.

In accomplishing the objects of this invention, it has been found that while the proportions of the fumaric-adipic acid mixture can vary over the stated range, a ratio of 75% by weight adipic and 25% by weight fumaric is optimum from a flavor, anti-caking, anti-browning, and a gelatin usage standpoint. At this 75:25 ratio a suitable tartness is achieved at pH of about 3.7 to 3.9 (dependent on the amount of buffer employed) and allows a substantial saving of gelatin to be realized which is almost equivalent to the saving possible when using 100% adipic while achieving the cake resistance and browning resistance of 100% fumaric. The flavor impact at this particular ratio also appears to be most pronounced and favorable.

For evaluating the contribution of adipic-fumaric acid mixtures containing varying percentages of each acid, reference may be had to the following table:

*Fumaric-adipic acid ratios*

| Acid ratio | Adipic acid | | Fumaric acid | | pH* |
|---|---|---|---|---|---|
| | Percent | g./pkg. | Percent | g./pkg. | |
| I | 100 | 2.5 | | | 4.1 |
| II | 75 | 1.8 | 25 | 0.5 | 3.8 |
| III | 50 | 1.2 | 50 | 1.0 | 3.6 |
| IV | 25 | 0.6 | 75 | 1.4 | 3.3 |
| V | | | 100 | 2.0 | 3.1 |

*Refers to pH in full product formula given below.

The starting point for the acid ratio tables was 2.5 grams for 100% adipic acid, each acid being varied according to its molecular weight. On this basis 100% fumaric acid was 2.0 gms. Each acid ratio was then incorporated into the indicated product formula and stored at 90° F. and 70% relative humidity.

A suitable product formula is as follows:

*Product formulation*

| Ingredient: | Weight/pkg. (grams) |
|---|---|
| Sugar | 80.0 |
| Gelatin | 10.0 |
| Trisodium citrate | 0.8 |
| Flavor—Strawberry | 1.0 |
| Color—CS-5 | 0.2 |
| Fumaric-adipic acid | 3.0 |

At levels of 10–35% fumaric and 65–90% adipic, the caking resistance of the combined adipic-fumaric formulations after 4–6 months of storage was unexpectedly found to be equivalent to formulations using 100% fumaric. In general, it was observed that the fruit flavor provided by the gelatin dessert mix, wherein the fumaric acid was present as a minor proportion by weight of the adipic, was preferable to mixes wherein adipic acid or fumaric acid was employed exclusively. Similarly, the browning resistance of these gelatin dessert mixes on accelerated storage tests (approximately 6 months of storage under the most adverse conditions, i.e., 100° F. and 90% humidity), was found to approach the browning resistance of a formulation using 100% fumaric.

The term, "adipic acid," as employed in this specification is meant to include adipic acid and its acid salts, such as the alkali metal salts of adipic acid, like sodium. Likewise the term, "fumaric acid," is intended to embrace fumaric acid and its acid salts soluble in the gelatin dessert mix under the conditions of use, e.g. sodium fumarate.

Adipic and fumaric acid in the aforestated percentages by weight in the acidulent system may also contain other edible food acids such as "oxy acids" like citric, tartaric, malic, and the like. However, when another acid is employed in combination with adipic and fumaric acid, the caking resistance which is enjoyed by these acids in combination is substantially nullified, and accordingly it is preferred to employ as the acidulent an adipic-fumaric acid mixture which is substantially free of any other food acid acidulent. However, the invention is not to be limited to such a practice since, even in cases where fumaric and adipic acid are employed in the aforestated proportions, the fumaric acid still serves to modify the sharp, mineral-like quality of the adipic acid, and consequently permits a saving in the level of flavor as well as in the level of gelatin required for a particular gelatin jelly dessert mix.

While this invention has been described by reference to a specific example, it is understood to be limited only by the scope of the appended claims.

What is claimed is:

1. A fruit-flavored gelatin jelly dessert composition which gives desired tartness on addition to water at a pH of 3.7–4.0 and exhibiting improved resistance to caking, comprising gelatin and as a major acidulent, 65–90% by weight adipic acid; and 10–35% by weight fumaric acid as a minor acidulent.

2. The composition of claim 1 wherein the acidulent is 75% by weight adipic acid and 25% by weight fumaric acid.

3. A fruit-flavored gelatin jelly having desired tartness at a pH of 3.7–4.0 wherein the acidulent consists essentially of 65–90% by weight adipic and 10–35% by weight fumaric acid.

4. The gelatin jelly of claim 3 wherein the acidulent is 75% by weight adipic acid and 25% by weight fumaric acid.

References Cited by the Examiner
UNITED STATES PATENTS 2,657,996  11/1953  Ferguson _____ 99—130
3,041,179   6/1962  Lister et al. _____ 99—130 X A. LOUIS MONACELL, *Primary Examiner.*

BEATRICE H. STRIZAK, *Examiner.*